United States Patent
Grieser-Schmitz (12) 
(10) Patent No.: US 11,570,250 B2
(45) Date of Patent: Jan. 31, 2023

(54) COMMUNICATION SYSTEM AND METHOD FOR COMMUNICATION FOR A MOTOR VEHICLE

(71) Applicant: ZF Active Safety GmbH, Koblenz (DE)

(72) Inventor: Stefan Grieser-Schmitz, Koblenz (DE)

(73) Assignee: ZF ACTIVE SAFETY GMBH, Koblenz (DE)

(*) Notice: Subject to any disclaimer, the term of this patent is extended or adjusted under 35 U.S.C. 154(b) by 395 days.

(21) Appl. No.: 16/798,470

(22) Filed: Feb. 24, 2020

(65) Prior Publication Data
US 2020/0274928 A1    Aug. 27, 2020

(30) Foreign Application Priority Data
Feb. 27, 2019  (DE) .................... 10 2019 104 948.2

(51) Int. Cl.
| | | |
|---|---|---|
| *H04L 67/12* | (2022.01) | |
| *H04L 1/18* | (2006.01) | |
| *B60R 16/023* | (2006.01) | |

(52) U.S. Cl.
CPC ............ *H04L 67/12* (2013.01); *B60R 16/023* (2013.01); *H04L 1/189* (2013.01)

(58) Field of Classification Search
CPC . H04L 67/12; H04L 1/189; H04L 1/24; H04L 2012/40215; H04L 2012/40273; H04L 12/40; H04L 63/1425; H04L 12/40032; H04L 63/1416; H04L 12/40013; H04L 12/40169; H04L 63/1408; H04L 63/1441; B60R 16/023; B60R 16/0231; G06F 21/85; G06F 11/30; G06F 11/3027; G06F 11/3051; G06F 13/42; B60W 50/023; B60W 50/0205
See application file for complete search history.

(56) References Cited

U.S. PATENT DOCUMENTS

| | | | |
|---|---|---|---|
| 10,112,591 B2 | 10/2018 | Sautter | |
| 10,567,192 B2* | 2/2020 | van de Burgt | ...... H04L 12/4013 |

(Continued)

FOREIGN PATENT DOCUMENTS

| | | | | |
|---|---|---|---|---|
| CN | 102611600 A | * | 7/2012 | |
| WO | WO-2018079280 A1 | * | 5/2018 | ............. B60R 16/02 |
| WO | 2019185368 | | 10/2019 | |

*Primary Examiner* — Michael K Phillips
(74) *Attorney, Agent, or Firm* — Tarolli, Sundheim, Covell & Tummino LLP (57) ABSTRACT

A communication system intended for use in a motor vehicle includes a plurality of devices (26, 28), a transmission channel (32) that connects the plurality of devices (26, 28) to one another, and a signal source (30) coupled to the transmission channel (32). Each of the devices (26, 28) includes a control unit (36) configured for evaluating signals of the transmission channel (32), and at least two coupling units (38, 40) configured for connecting and disconnecting the particular device (26, 28) to/from the transmission channel (32). The control units (36) of the devices (26, 28) are configured for causing the coupling units (38, 40), at a certain point in time, in each case to connect no more than one of the devices (26, 28) to the transmission channel (32), and to disconnect the other of the devices (26, 28) from the transmission channel (32).

11 Claims, 3 Drawing Sheets

(56) References Cited

U.S. PATENT DOCUMENTS

| | | | |
|---|---|---|---|
| 2014/0365693 A1* | 12/2014 | Monroe | G06F 3/00 710/105 |
| 2015/0095532 A1* | 4/2015 | Muth | G06F 3/00 710/105 |
| 2016/0164718 A1* | 6/2016 | Choi | H04L 43/0811 370/228 |
| 2018/0032413 A1* | 2/2018 | Naganathan | G06F 11/1625 |
| 2018/0113836 A1* | 4/2018 | Hirata | H04L 69/40 |
| 2018/0262527 A1* | 9/2018 | Jain | H04L 9/0838 |
| 2018/0287922 A1* | 10/2018 | Hirata | H04L 43/0882 |
| 2018/0290642 A1 | 10/2018 | Tschiene | |
| 2019/0302753 A1* | 10/2019 | Fujii | G05D 1/0088 |
| 2019/0337526 A1* | 11/2019 | Rave | G06F 21/554 |
| 2019/0340116 A1* | 11/2019 | Miyauchi | G06F 11/203 |
| 2020/0301695 A1* | 9/2020 | Ogawa | G06F 8/65 |
| 2021/0114567 A1* | 4/2021 | Rebholz-Goldmann | B60T 8/171 |
| 2021/0394771 A1* | 12/2021 | Plecko | B60W 50/0205 |

* cited by examiner

COMMUNICATION SYSTEM AND METHOD FOR COMMUNICATION FOR A MOTOR VEHICLE

RELATED APPLICATION

This application claims priority from German Application No. 10 2019 104 948.2, filed Feb. 27, 2019, the subject matter of which is incorporated herein by reference in its entirety.

BACKGROUND OF THE INVENTION

A system and a method for communication between a plurality of devices via a shared transmission channel in a motor vehicle are disclosed. The system and the method are characterized in particular in that they allow redundant reading of a signal source that is coupled to the transmission channel. An efficient, cost-effective option for reading out signal sources in motor vehicles is provided in this way. In addition, the safety is increased for persons in particular in semiautonomously controlled or autonomously controlled motor vehicles.

PRIOR ART

The detection of certain traffic situations and their correct interpretation represents a key aspect in the present development of (semi)autonomously or autonomously controlled motor vehicles. In these types of motor vehicles, current advanced driver assistance systems (ADAS) offer numerous monitoring and information functions for driving a motor vehicle in traffic, which is becoming increasingly heavier, in a safer and more comfortable manner. For this purpose, the surroundings of the motor vehicle are monitored, based on surroundings data obtained from one or more surroundings sensors situated on the motor vehicle.

The speed of a motor vehicle is adapted to the speed of a preceding motor vehicle, for example in so-called adaptive cruise control (ACC) systems via automatic speed control, based on the obtained surroundings data. The aim is generally to maintain a certain distance from the preceding motor vehicle. For this purpose, the stated systems determine a movement direction and/or a speed of the preceding motor vehicle.

In motor vehicles driven by persons, the driver assistance systems usually provide an information function in order to warn the driver of a critical situation or a corresponding maneuver, or to recommend to the driver a suitable maneuver for the motor vehicle. The driver assistance systems may likewise be used in autonomously controlled motor vehicles in order to provide the autonomous control system with the appropriate surroundings data.

However, ADAS systems that are common nowadays do not operate just with the mentioned surroundings sensor system. Thus, vehicle-internal measured variables are also incorporated into the assessment of a current traffic situation for the motor vehicle. These measured variables are provided by vehicle-internal sensors and suitably processed by the controllers thereof. These include, for example, speed sensors, pressure sensors, temperature sensors, rotational speed sensors for the wheels and/or the engine of the motor vehicle, and many others.

Software- and/or hardware-based monitoring circuits are used for monitoring the secure functionality of devices, such as control devices, for the stated driver assistance systems. One system component monitors the functioning of other components of the same system. If an error state is recognized, this is signaled, for example, to a higher-order controller that once again brings the system into a defined state, for example by triggering a hardware reset. For example, watchdog timers may take over such tasks in control devices of motor vehicles.

Wireless and/or wired bus systems are generally used in motor vehicles for communication between these types of control devices. For example, control units for certain vehicle-internal sensors may communicate with one another via a LIN bus or a CAN bus. In addition, current loop interfaces are used to transmit data between vehicle-internal sensors and corresponding control devices, which then either use or redistribute these data. Two- or three-core lines are used which supply the sensors with power and at the same time allow transmission of their output signals.

Underlying Problem

Correct and efficient detection of sensor signals is essential for the failsafe performance of driver assistance systems and other control systems in present motor vehicles. In particular in conjunction with the development of motor vehicles for semiautonomous or autonomous driving and the resulting ever-increasing number of control devices in motor vehicles, a cost-effective and at the same time reliable approach for reading sensor signals is also necessary.

Proposed Solution

This object is achieved by a communication system having the features of Claim 1, and by a method for communication having the features of Claim 9. Preferred embodiments will become apparent from subclaims 2 through 8 and 10.

One aspect relates to a communication system for a motor vehicle, having a plurality of devices, a transmission channel that connects the plurality of devices to one another, and a signal source that is coupled to the transmission channel. Each of the devices includes a control unit that is configured for evaluating signals of the transmission channel, and at least two coupling units. The two coupling units are configured for connecting and disconnecting the particular device to/from the transmission channel. The control units of the devices are configured for causing the particular coupling units, at a certain point in time, in each case to connect no more than one of the devices to the transmission channel, and to disconnect the other of the devices from the transmission channel.

The certain point in time may in particular refer to any given point in time or a certain time period during operation of the motor vehicle. In other words, the communication system may be configured to cause the signals of the interface to be evaluated by only one of the plurality of devices at any given point in time, while the others of the plurality of devices are disconnected from the interface.

A communication system is thus provided which allows alternative access to the transmission channel for the devices, which may in particular be control devices for evaluating and/or generating signals of the motor vehicle. The signal source may accordingly be read in alternation by multiple control devices. For this purpose, the communication system provides that at the certain point in time, in each case only one of the devices is actively switched to the transmission channel, whereas the other devices are disconnected from the transmission channel. Due to the fact that each of the devices includes control units which provide that in each case only one of the devices is connected to the transmission channel while the other devices are disconnected from the transmission channel, error-tolerant reading of signals of the transmission channel is ensured. The communication system is flexible and modular, since the devices for connection and disconnection of the devices to/from the transmission channel each have a configuration that is functionally equivalent, in particular identical, in terms of circuitry.

According to certain exemplary embodiments, each of the devices may also include a monitoring unit that is coupled to the particular control unit and that is configured for recognizing an error state of the device in question and signaling to the control unit of the device in question. In these cases, the control units of the devices are configured to cause, at the certain point in time, the particular coupling units of the device, for which the error state has been recognized, to disconnect the device in question from the transmission channel.

In this way, when a defect is recognized in one of the devices, further access of the device in question to the transmission channel is prevented. This may also apply in particular when the device in question is active, but has an error state. This ensures that the signals of the transmission channel may still be received from the remaining devices, and the data transmission of the communication system is not disrupted by a defective device.

In certain embodiments, the control unit and/or monitoring unit contained in one of the devices may in each case be configured to cause the coupling units of the device in question to connect the device in question to the transmission channel or disconnect the device in question from the transmission channel.

The plurality of devices may be connected in parallel to one another via the transmission channel.

In certain embodiments, the signal source may include a switchable power source that is supplied with power by at least one of the devices via the transmission channel.

The signal source is accordingly configured for acting on the transmission channel with a current signal. This may be a preconditioned current signal of an integrated sensor, for example a pressure sensor, rotational speed sensor, and/or temperature sensor that represents the signal source. For this purpose, the integrated sensors may include, for example, internal circuit components for temperature compensation, for A/D conversion and/or for D/A conversion, or for current/voltage conversion, memory components, and/or computing components such as a microprocessor.

It may in particular be provided that the signal source at the certain point in time is supplied with power by the not more than one of the plurality of devices via the transmission channel, which at the certain point in time is connected, via its respective coupling units, to the transmission channel.

In these cases, the rest of the devices remain electrically passive; in other words, the remaining devices are not involved with supplying power to the signal source.

The plurality of devices may be configured for determining the not more than one device by communication among the plurality of devices.

For this purpose, the devices may be suitably connected via a communication link. The communication link may be a data channel or data bus, which may have a wired or wireless design.

The at least two coupling units of each device may include a high-side coupling unit and a low-side coupling unit. In these cases, the two coupling units control the connections of the signal source to the negative potential (low-side coupling unit) and to the positive potential (high-side coupling unit) of the power supply to the device.

The high-side coupling unit as well as the low-side coupling unit may be made up of a switching component or multiple switching components. These switching components include electromechanical switching components such as relays and electronic switching components such as semiconductor relays, bipolar transistors, field effect transistors, thyristors, diacs, triacs, etc.

In certain embodiments, each of the devices may also include a signal conditioning unit that is configured for receiving the signals of the transmission channel and providing them to the control unit of the device in question in a defined format.

The signal conditioning unit, in particular when no integrated sensor having corresponding signal conditioning components is present as a signal source, may ensure that the control unit of the particular device is provided with the data from the transmission channel in a data format that can be interpreted for the control unit.

In certain embodiments, the transmission channel may have a two-core design. In these cases, the signal source may be configured for acting on the transmission channel with a current signal.

Accordingly, the transmission channel may be a two-core current loop in which the transmitter is made up of the switchable power source and is supplied with power by the receiver, i.e., one of the devices. This may involve a 4-20 mA current loop, for example. As an alternative to the two-core design, this current loop may have a three-core design or a design with more than three cores. In the case of the three-core design, one of the cores may be used for supplying power to the signal source, while the remaining two cores are used for signal transmission, i.e., represent the transmission channel.

The transmission channel is thus designed as a current loop interface that may be selectively used by the plurality of devices. Devices for which an error state has been recognized are automatically disconnected from the current loop interface by the communication system in order to prevent a disturbance of the current loop interface, for example by coupling in faulty signals.

A further aspect relates to a method for communication between a plurality of devices, each having a control unit, in a motor vehicle. The plurality of devices are situated in the motor vehicle and connected to one another via a transmission channel. The transmission channel is coupled to a signal source. The method comprises:

the control units of the devices causing one of the plurality of devices to be connected to the transmission channel via at least two coupling units of the device in question at a certain point in time;

the control units of the devices causing the others of the plurality of devices to be disconnected from the transmission channel, in each case via at least two coupling units of the others of the plurality of devices, at the certain point in time; and the control unit of the device, which is connected to the transmission channel at the certain point in time, evaluating signals of the transmission channel.

Yet a further aspect relates to a motor vehicle that includes a communication system described above.

Compared to conventional driver assistance systems and other systems used in motor vehicles for semiautonomous or autonomous driving for communication between control units and/or sensors, the approach presented here increases the failsafe performance and thus the driving safety in a cost-effective manner, since, based on the presented approach for redundant reading of nonredundantly designed sensor systems, a robust communication interface is made possible while at the same time a duplicate sensor system is spared.

It is apparent to those skilled in the art that the aspects and features described above may be arbitrarily combined in a communication system and/or in a method for communication between devices in a motor vehicle. Although some of the above-described features have been described with regard to a communication system, it is understood that these features are also applicable to a method for communication between devices in a motor vehicle. Similarly, the features described above with regard to a method for communication between devices in a motor vehicle are correspondingly applicable to a communication system.

BRIEF DESCRIPTION OF THE DRAWINGS

Further aims, features, advantages, and possible applications result from the following description of exemplary embodiments, which are not to be construed as limiting, with reference to the associated figures. All features described and/or graphically illustrated, alone or in any combination, constitute the subject matter disclosed herein, also independently of their grouping in the claims or their back-references.

DETAILED DESCRIPTION OF THE DRAWINGS

Within the scope of the following disclosure, certain aspects are described primarily with regard to the communication system. However, all of these described aspects are also applicable within the scope of the method for communication between devices in a motor vehicle, which may be carried out, for example, by a central control device of the motor vehicle. This may take place by making suitable write and read access to an internal and/or external memory associated with the motor vehicle. The communication method may be implemented within the motor vehicle as hardware or software, or as a combination of hardware and software. Also included are digital signal processors, application-specific integrated circuits, field-programmable gate arrays, and other suitable switching and computing components.

Figure 1:
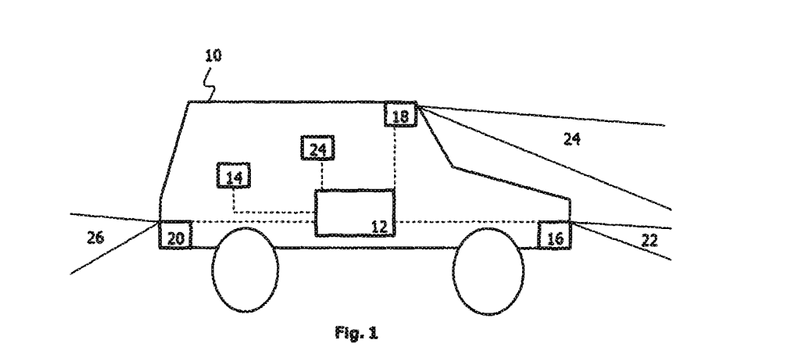
FIG. 1 schematically shows a motor vehicle having a communication system according to certain exemplary embodiments, FIG. 2 schematically shows a block diagram for a communication system having certain system components according to certain exemplary embodiments, FIG. 3 schematically shows an implementation form of the communication system, having a sensor and a current loop according to certain exemplary embodiments.

Reference is first made to FIG. 1, which schematically illustrates a motor vehicle 10 that includes a control system 12 and a communication system 14. The control system 12 is coupled to at least one surroundings sensor 16, 18, 20 situated on the motor vehicle 10 in order to obtain surroundings data from the at least one sensor 16, 18, 20. The control system 12 may include an electronic control unit (ECU), not illustrated in the figure. For example, the control system 12 may be at least configured and intended, with the aid of the ECU and/or other electronic control systems, for determining a future maneuver for the motor vehicle 10 and/or for other motor vehicles based on a current traffic situation of the motor vehicle 10. For example, the ECU receives signals from the surroundings sensors 16, 18, 20, processes these signals and the associated surroundings data, and generates control signals and/or output signals. The further electronic control systems may in particular be control units for semiautonomous or autonomous driving, such as an ACC device, an emergency braking assistant, and/or control units for further driver assistance systems. Alternatively, the latter-named control units may in each case also be integrated into a separate controller (not shown in FIG. 1) or combined in an electronic controller 24 for driver assistance systems outside the control system 12.

FIG. 1 illustrates three surroundings sensors 16, 18, 20 which transmit appropriate signals to the control system 12 or the electronic control unit ECU. In particular, at least one surroundings sensor 16 that detects an area 22 in front of the motor vehicle 10 is situated on the motor vehicle 10, facing the front in the travel direction of the motor vehicle 10. This at least one surroundings sensor 16 may be situated, for example, in the area of a front bumper, a front light, and/or a front radiator grill of the motor vehicle 10. Thus, the surroundings sensor 16 detects an area 22 directly in front of the motor vehicle 10.

At least one additional or alternative surroundings sensor 18, likewise facing the front in the travel direction of the motor vehicle 10, is situated in the area of the windshield of the motor vehicle 10. For example, this surroundings sensor 18 may be situated between a rearview mirror of the motor vehicle 10 and its windshield. Such a surroundings sensor 18 detects an area 24 in front of the motor vehicle 10; depending on the design of the motor vehicle 10, an area 24 directly in front of the motor vehicle 10 cannot be detected due to the front section (or geometry) of the motor vehicle 10.

In addition, at least one surroundings sensor 20 may be situated at the side and/or the rear of the motor vehicle 10. This optional surroundings sensor 20 detects an area 26 to the side of and/or behind the motor vehicle 10 in the travel direction of the motor vehicle 10. For example, the data or signals of this at least one surroundings sensor 20 may be used to verify information that is detected by the other surroundings sensors 16, 18, and/or to determine a curvature of a lane traveled on by the motor vehicle 10.

The at least one surroundings sensor 16, 18, 20 may be implemented in any desired manner, and may include a front camera, a rear camera, a side camera, a radar sensor, a lidar sensor, an ultrasonic sensor, and/or an inertial sensor. For example, the surroundings sensor 16 may be implemented in the form of a front camera or a radar, lidar, or ultrasonic sensor. A front camera is particularly suited for the surroundings sensor 18 situated at a higher level, whereas the surroundings sensor 20 situated in the rear of the motor vehicle 10 may be implemented in the form of a rear camera or a radar, lidar, or ultrasonic sensor.

The electronic control unit ECU processes the surroundings data obtained from the surroundings sensor(s) 16, 18, 20 situated on the motor vehicle 10 in order to obtain information concerning the surroundings of the motor vehicle 10 in a current traffic situation. This includes, for example, roadway boundaries and markings of a roadway currently being traveled on by the motor vehicle 10, as well as other motor vehicles or road users in the surroundings of the motor vehicle 10.

The electronic control unit processes the surroundings data obtained from the surroundings sensor(s) 16, 18, 20 situated on the motor vehicle 10 in order to detect a lane traveled on by the motor vehicle 10 via a first and a second lateral lane boundary in front of the motor vehicle 10. In addition, the electronic control unit ECU processes the surroundings data obtained from the surroundings sensor(s) 16, 18, 20 situated on the motor vehicle 10 in order to detect a lane traveled on by another motor vehicle (the lane adjacent to the lane traveled on by the motor vehicle 10, where "adjacent" means that one or more further lanes may also be situated between the adjacent lanes), and its lateral lane boundaries in front of, to the side of, and/or behind the motor vehicle 10.

For this purpose, the surroundings sensors 16, 18, 20 provide surroundings data to the control system 12 or the electronic control unit ECU that represent the area in front of, to the side of, and/or behind the motor vehicle 10. To this end, the control system 12 is connected to the at least one surroundings sensor 16, 18, 20 via at least one data channel or bus (illustrated by dashed lines in FIG. 1). The data channel or bus may be implemented in a wired or wireless manner.

Alternatively or additionally, the control system 12 or its electronic control unit ECU may obtain data from one or more other assistance systems, for example from the electronic controller 24, which indicate or allow the derivation of the lanes traveled on by the motor vehicle 10 and further motor vehicles via their lateral lane boundaries. Thus, data and information already determined by other systems may be used by the control system 12.

In addition, the control system 12 or its electronic control unit ECU determines a driving situation with the surroundings sensors, i.e., based on the surroundings data obtained using the at least one surroundings sensor 16, 18, 20. Here as well, an assistance system that is already present or the electronic controller 24 may alternatively or additionally supply data and/or information which define(s) a driving situation, or from which a driving situation may be quickly derived.

The electronic controller 24 may also be configured and intended for autonomously and/or semiautonomously controlling the motor vehicle. In this case, the control system 12 is configured and intended for outputting data to the electronic controller 24 for autonomous driving. In particular, the control system 12 (or its ECU) may output data that indicate to the component 24 a course of a certain motion path that the motor vehicle 10 is to subsequently follow (according to the current traffic situation). The data may likewise be transmitted via a data channel or bus in a wired or wireless manner.

The information obtained from the surroundings data and provided to the control system 12 includes, for example, positions and/or speeds and/or accelerations of the motor vehicle 10 and/or of other motor vehicles in the surroundings of the motor vehicle 10, in each case in the lateral or longitudinal direction or a combination of lateral and longitudinal directions. In addition, this information includes, for example, relative speeds and/or relative accelerations between the motor vehicle 10 and the other motor vehicles in each of the directions in question.

As is apparent from FIG. 1, the control system 12 is connected to the communication system 14 via a data channel or bus, illustrated by dashed lines, for the bidirectional data exchange. The data channel or bus may be implemented in a wired or wireless manner. A plurality of devices that are responsible, for example, for monitoring vehicle-internal states of the motor vehicle 10 may be combined in the communication system 14. The plurality of devices may in each case be, for example, control devices that read out information from certain signal sources such as sensors, for example pressure sensors, temperature sensors, and/or rotational speed sensors of the motor vehicle 10, and then provide the obtained data to the control system 12. The control system 12 may in turn provide these data to the electronic controller 24 for the driver assistance systems. In this way, the variables monitored by the communication system 14 may be incorporated into the decision-making for the semiautonomous driving and/or autonomous driving.

The communication system 14 is now further described with reference to FIG. 2. As shown in the figure, the communication system 14 of the motor vehicle 10 includes a plurality of devices 26, 28. However, the number of devices is not limited to the two devices 26, 28 shown by way of example in FIG. 2. The communication system 14 may include numerous other devices, which are not shown in FIG. 2 for the sake of clarity. In addition, the communication system 14 includes a signal source 30 and a transmission channel 32 that connects the signal source 30 to the devices 26, 28. The devices 26, 28 are connected to one another in parallel, and can communicate with one another via a communication link 34.

Each of the devices 26, 28 includes a control unit 36, two coupling units 38, 40, a monitoring unit, 42, and an optional signal conditioning unit 44. The number of coupling units 38, 40 is not limited to two, and each of the devices 26, 28 may optionally also include more than two coupling units 38, 40. In such cases, the number of coupling units 38, 40 may in particular be a multiple of two.

The control unit 36 of each device 26, 28 is connected to the monitoring unit 42 of the corresponding device 26, 28, and is configured for exchanging data with the monitoring unit 42. The monitoring unit 42 is coupled to each of the coupling units 38, 40. In addition, the control unit 36 may in each case have a communication link (illustrated in dashed lines in FIG. 2) with the coupling units 38, 40 of the corresponding device 26, 28. It is thus possible to control the coupling units 38, 40 of each device 26, 28 via its respective control unit 36 and/or its respective monitoring unit 42.

The devices 26, 28 may each be coupled, i.e., connected, to the transmission channel 32 via the coupling units 38, 40, one of which is designed as a high-side coupling unit 38 and the other as a low-side coupling unit 40. In other words, the particular devices 26, 28 may be prompted by their control units 36 and/or by their monitoring units 42 to become isolated, as necessary, from the transmission channel via the coupling units 38, 40. The coupling units 38, 40 thus represent switching components in each case, and may have an electromechanical and/or electronic design.

The coupling units 38, 40 may thus be designed as transistors, relays, and/or diodes, for example, the present disclosure not being limited thereto. The coupling units 38, 40 may also be made up, for example, of a mixture of electronic and electromechanical components, for example a (semiconductor) relay connected to an optocoupler, to allow a galvanic separation between the devices 26, 28 and the transmission channel 32 to be achieved.

When one of the devices 26, 28 via its coupling units 38, 40 is connected to the transmission channel 32 or receives signals via same, these input signals are supplied to the optional signal conditioning unit 44 via the coupling units 38, 40. If the signal conditioning unit is not present, the input signals are, for example, transmitted directly to the particular control unit 36.

The signal conditioning unit 44 is used to condition the input signals for the particular device 26, 28. Suitable measuring transducers, measuring amplifiers, A/D converters, D/A converters, and/or other components, for example for current and/or voltage conversion, are used for this purpose, depending on the input signal and/or the device 26, 28. These components are used to convert the input signal into a data format that can be interpreted for the control unit 36 of the corresponding device 26, 28. This may, but does not have to be, necessary within the scope of the present disclosure. Thus, for example, as an alternative an input signal that is already conditioned, i.e., interpretable for the particular control unit 36, may be present at the coupling units 38, 40 of the corresponding device 26, 28. The signal conditioning unit 44 of this device 26, 28 is then optional, as indicated in FIG. 2 by the dashed-line outline of the signal conditioning unit 44.

Figure 2:
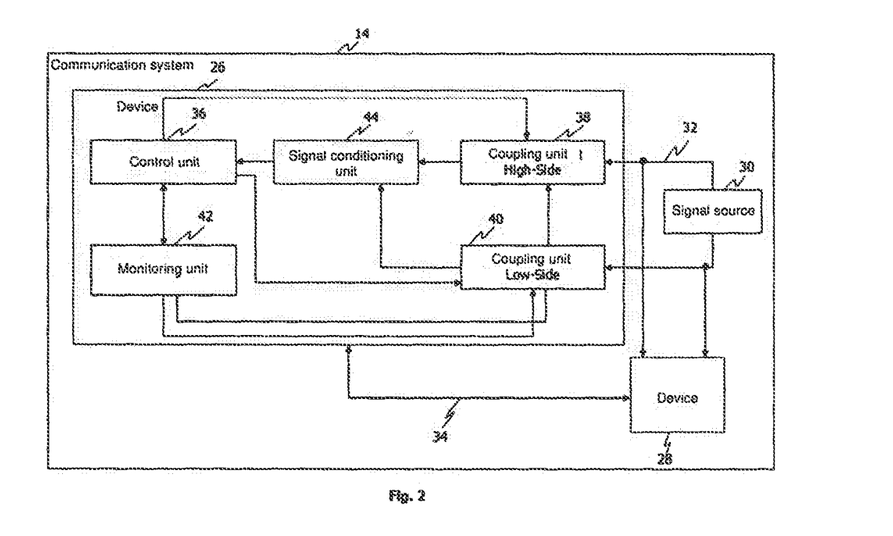

The signal conditioning unit 44 may also contain a measuring circuit (not shown in FIG. 2). The measuring circuit may be, for example, a circuit for measuring current, voltage, and/or power. The measuring circuit is configured and intended for measuring a current and/or a voltage of the input signals and/or the conditioned input signals of the device 26, 28 in question. For this purpose, the measuring device may alternatively be situated outside the signal conditioning unit 44, but inside the device 26, 28. In the latter case, the measuring circuit is in each case connected to the coupling units 38, 40 and to the control unit 36 of the corresponding device 26, 28, for example connected in between, a connection to the signal conditioning unit 44 also being possible, if it is present.

The monitoring unit 42 is used to monitor the system functions of the particular device 26, 28 and recognize error states. In particular, the monitoring unit 42 is configured for recognizing error states within the control unit 36 and/or other components of the device 26, 28 in question. The error states may be hardware- and/or software-related. An error state may exist, for example, when the control unit 36 and/or other components of the device 26, 28 in question is/are not functioning correctly.

When the monitoring unit 42 recognizes an error state, it may signal this to the control unit 36 of the device 26, 28 in question. The control unit 36 may then disconnect the device 26, 28 in question from the transmission channel 32 via the coupling units 38, 40 of the corresponding device 26, 28.

The monitoring unit 42 may be designed as a watchdog timer or some other suitable counter, the present disclosure not being limited thereto. Also suitable besides software-based watchdog timers are hardware watchdog timers that are in particular integrated into the particular device 26, 28. These may be designed as timeout watchdogs, window watchdogs, and/or intelligent watchdogs, for example.

The control unit 36 signals to the monitoring unit 42 at regular intervals that no error state (also referred to as malfunction) of the control unit 36 or the other components is present within the device 26, 28 in question. For the monitoring unit 42 that is designed as a counter, this may take place, for example, by incrementing the counter or setting it to a certain value at the end of a function test of the system components by the control unit 36, for example, and then decrementing the counter during continued error-free operation, by means of software or hardware. If the counter reaches zero or the control unit 36 does not notify the watchdog timer in a timely manner, this is regarded as the occurrence or recognition of an error state. Alternatively, when a window watchdog is used, a time window may exist for the control unit 36 to provide feedback to the monitoring unit 42. An intelligent watchdog requests the correct response from the control unit 36 to a question, within the meaning of a challenge-response process.

In such cases, the device 26, 28 within which an error state has been recognized may be isolated from the transmission channel 32 by disconnecting the coupling units 38, 40 of the corresponding device 26, 28. The other devices 26, 28 (connected in parallel to the faulty device 26, 28) are not affected thereby, and may continue to access the transmission channel 32 by means of their coupling units 38, 40.

The transmission channel 32 is designed as a two-core transmission channel 32 in the example according to FIG. 2. However, the present disclosure is not limited thereto. Alternatively, the transmission channel 32 may be a three-core transmission channel or a transmission channel having more than three cores. The transmission channel 32 may be designed as a current loop, for example (also referred to as a current interface or current loop interface). In this case, for example a twisted, two-core cable may be used as the voltage supply (also referred to as the power supply) for the signal source 30, and also as the transmission line for signals that are generated by the signal source 30. If the transmission channel 32 has a three-core design, an additional line for supplying power to the signal source 30 is provided.

The transmission channel 32 may be designed, for example, as a 4-20 mA sensor interface (also referred to as a 4-20 mA current loop). In this case, the signal source 30 is configured for providing an output current that varies between 4 mA and 20 mA. A voltage source, not shown in FIG. 2, within one of the devices 26, 28 or the voltage source of one of the devices 26, 28 connected to the signal source 30 via the transmission channel 32 may then be used to supply power to the signal source 30. The signal source 30 then represents a voltage-controlled power source 30 that converts a voltage signal into a current signal.

The output current of the signal source 30, which is conducted as an input signal to the particular device 26, 28 that is connected to the signal source 30 via the transmission channel 32, may represent analog or digital information for the particular device 26, 28 or its control unit 36. Thus, for example, the signal source 30 may continuously generate current signals between 4 mA and 20 mA which are then measured in the receiving device 26, 28, for example by the measuring circuit, as a voltage drop over a shunt or directly as a current. Alternatively, it is possible for the signal source 30 to generate only two different current levels, which then correspond to digital information. In this case, the presence or the absence of a current is evaluated as binary information. In the latter case, the measuring circuit is made up of a current measuring circuit within the particular device 26, 28, which evaluates the different current levels (4 mA; 20 mA). The different current levels may be converted, in the signal conditioning unit 44, for example, into binary information, which may then be interpreted by the control unit 36.

The output signal of the signal source 30 may be read by each of the parallel devices 26, 28 of the communication system 14. In addition, each of the devices 26, 28 may deliver the power supply for the signal source 30. However, according to the present disclosure the communication system 14 is configured and intended for allowing, at a certain point in time or for a certain time period, only one of the devices 26, 28 access to the transmission channel 32, in each case via their respective coupling units 38, 40. The other devices 26, 28 are denied access to the transmission channel 32, at least until the connected device 26, 28 has once again been isolated from the transmission channel 32. In other words, it is required that only one of the devices 26, 28 always actively supplies power to the signal source 30, while the other devices 26, 28 remain electrically passive to allow an error-free alternative reading of the output signals of the signal source 30 by the devices 26, 28.

The devices 26, 28, using the communication link 34, determine directly among one another which of the devices 26, 28 obtains access to the transmission channel 32, and thus to the output signal of the signal source 30, at a certain point in time. For this purpose, the devices 26, 28 or their control units 36 (one or more thereof) may determine or coordinate which of the devices 26, 28 obtains access to the transmission channel 32. The device 26, 28 that receives access then also supplies the signal source 30 with power via the transmission channel 32.

The coordination of which of the devices 26, 28 obtains access to the transmission channel 32 at a certain point in time may take place, for example, based on suitable priority information, and in particular may include whether or not one of the devices 26, 28 at the certain point in time (also referred to as the access point in time) has an error state that has been recognized by the corresponding monitoring unit 42, for example. An arbiter may also be optionally coupled to the communication link 34 between the devices 26, 28, which, based on the information (time information or priority information, for example) provided by the control units 36 of the devices 26, 28, decides which of the devices 26, 28 obtains access to the transmission channel 32 at a certain point in time.

An implementation example of the communication system 14 is now described with reference to FIG. 3. It is pointed out that, for the sake of clarity, not all of the components of the particular devices 26, 28 shown in FIG. 2 are denoted; however, the communication system 14 shown in FIG. 3 may, but does not have to, contain all components according to FIG. 2.

Figure 3:
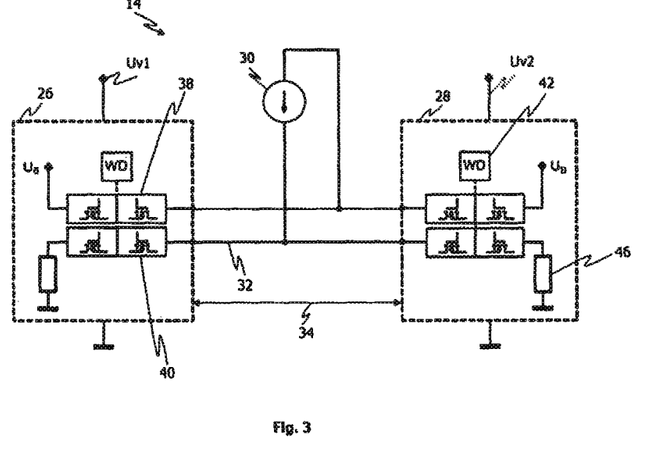

FIG. 3 schematically shows two devices 26, 28 in the form of control devices 26, 28 for a wheel speed sensor 30. In this case the wheel speed sensor 30 is a wheel speed sensor for one of the wheels of the motor vehicle 10. The transmission channel 32 is designed as a two-core current interface. The wheel speed sensor 30 is thus a passive wheel speed sensor 30 whose output signals are alternately read by the two control devices 26, 28 via the current interface 32. The reading control device 26, 28 at the same time supplies the wheel speed sensor 30 with power.

The resistor 46 may be a shunt, for example, via which the measuring circuit described with reference to FIG. 2 measures a voltage drop that is proportional to the current through the shunt, i.e., proportional to the input signal of the particular control device 26, 28 or to the input signal that is conditioned by the signal conditioning unit 44. In this case, the measuring circuit is designed as a voltage measuring circuit.

The communication system 14 according to FIG. 3 is configured for the devices 26, 28 to read the output signal of the wheel speed sensor 30 in alternation. In other words, at a certain point in time or within a certain time period only one of the devices 26, 28 can actively access the current signal of the wheel speed sensor 30. At this point in time the other device 26, 28 is disconnected from the current loop 32. The communication system 14 according to FIG. 3 may, for example, be part of a redundantly designed wheel slip control system and/or regulation system for the motor vehicle 10. Due to the sensor signal of the wheel speed sensor 30 being read in alternation, it is possible for the wheel slip regulation system to continue operation, for example, when there is a defect in one of the control devices 26, 28, without the need for an additional wheel speed sensor.

However, in order to supply the wheel speed sensor 30 with the necessary power for measuring the wheel speed of the motor vehicle 10, one of the two devices 26, 28 must always be connected to the current loop 32 via its respective coupling units 38, 40. However, this does not mean that the device 26, 28 connected in each case to the current loop 32 also has to (actively) read and/or process the output signal of the wheel speed sensor 30 at any point in time, i.e., continuously. The device 26, 28 in question may also take over only the supplying of power to the wheel speed sensor 30.

For generating the supply power, i.e., the supply voltage for the wheel speed sensor 30, the two control devices 26, 28 each have an internal voltage source $U_B$. In the example according to FIG. 3, this voltage source is different from the supply voltages Uv1 and Uv2 of the control devices 26, 28, respectively, although it may also be the same. For example, the supply voltage for the wheel speed sensor 30 may be obtained from the supply voltage Uv1, Uv2 of the particular device 26, 28, using suitable voltage regulation components.

In the example according to FIG. 3, the monitoring units 42 have the same design as watchdog timers that are integrated into the particular device 26, 28. The monitoring units are coupled to the particular control units 36 (not shown in FIG. 3) of the control devices 26, 28. In addition, the monitoring units 42 have a communication link to the particular coupling units 38, 40. In the example according to FIG. 3, the coupling units 38, 40 themselves are designed as self-blocking n-channel MOSFETs. However, the present disclosure is not limited thereto. Alternatively, bipolar transistors or relays or all switching components for the coupling units 38, 40 described with reference to FIG. 2 may also be used here.

Each of the coupling units 38, 40 includes two MOSFETs that are connected in series by way of example. Alternatively, the two MOSFETs of the coupling units 38, 40 may be connected in parallel.

In the example according to FIG. 3, the communication system 14 is configured and intended for ensuring continuous, redundant monitoring of the wheel speed sensor 30 during operation, in particular in the driving mode of the motor vehicle 10. For this purpose, the control unit 36 of the particular device 26, 28 determines a wheel speed based on the sensor signals of the wheel speed sensor 30 provided via the current loop 32. This wheel speed may then be provided to the control system 12 and/or the electronic controller 24 for driver assistance systems of the motor vehicle 10. To allow a redundant sensor system to be dispensed with, i.e., to not have to use two wheel speed sensors 30, the communication system 14 provides a technique for redundantly reading the sensor signals from the current loop 32.

The devices 26 and 28 of the communication system 12 decide among one another which of the devices 26, 28 is to determine the wheel speed at a certain subsequent point in time. For this purpose, the devices 26, 28 communicate via the communication channel 34 and decide which of the devices 26, 28 is to supply the wheel speed sensor 30 with power. For example, if the particular control unit 36 or the particular monitoring unit 42 has recognized an error state, one device 26, 28 may signal, via the communication link 34, to the other device 26, 28 that supplying the sensor 30 with power and reading the signal from the current loop 32 are not possible at the present time. In this case, the respective other device 26, 28 is responsible for monitoring the wheel speed of the motor vehicle 10.

Another coordination scenario (not shown in the figures) may be based on priorities, for example when the communication system 14 is not to ensure just a redundant reading of the sensor signal of the sensor 30 by the plurality of devices 26, 28, but, rather, to ensure when the wheel speed must be read by the different devices 26, 28 for different tasks (which must be processed based on different time constraints, for example). In such cases, for example based on the times remaining for the particular devices 26, 28 to fulfill their corresponding tasks, a suitable prioritization may take place, and the device 26, 28 with the shortest time window until performing the task may be the first device 26, 28 to obtain access to the current loop 32.

When the devices 26, 28 have determined which of the devices 26, 28 are to supply the wheel speed sensor 30 with power via the internally generated operating voltage $U_B$ and to read the output signal of the wheel speed sensor 30, the control unit 36 and/or the monitoring unit 42 of the corresponding device 26, 28 cause(s) this device to be disconnected from the current loop 32. This is achieved via the corresponding coupling units 38, 40, which are controlled by the control unit 36 and/or the monitoring unit 42, in order to disconnect the electrical connection of the device 26, 28 from the current loop 32. In other words, the device in question 26, 28 is isolated from the current loop 32 by means of its coupling units 38, 40.

At the same time or essentially at the same time, a connection to the current loop 32 is established for the other of the devices 26, 28 via its coupling units 38, 40. This takes place once again by suitable control of the coupling units 38, 40 of the corresponding device 26, 28 via its control unit 36 and/or its monitoring unit 42. As soon as the connection to the current loop 32 is established, the other of the devices 26, 28 may then supply the wheel speed sensor 30 with power via the current loop 32 and read the output signal of the wheel speed sensor 30.

If an error state is then recognized in the device 26, 28, which supplies the wheel speed sensor 30 with power and reads the sensor signal, by the monitoring unit 42 of the device, the coupling units 38, 40 of this device 26, 28 are decoupled from the current loop 32, as described.

At the same time or essentially at the same time, the other device 26, 28 is signaled via the communication link 34 that an error state has been recognized in the device 26, 28. If no error state is present in the other device 26, 28 at this point in time, the control units 36 of the two devices 26, 28 determine that the other device 26, 28 takes over supplying the wheel speed sensor 30 with power and monitoring the wheel speed, i.e., monitoring the sensor signal of the wheel speed sensor 30.

Figure 4:
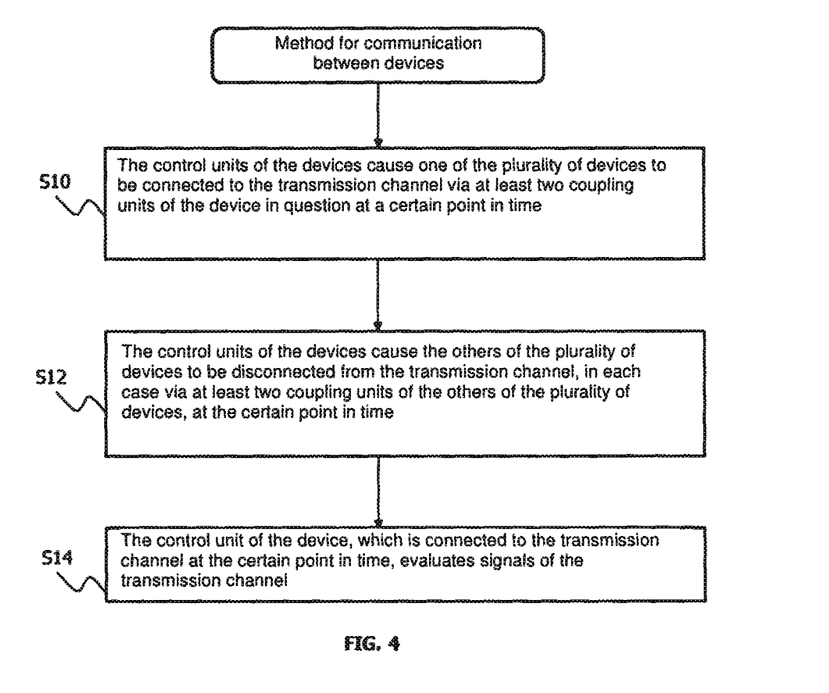
FIG. 4 shows a flow chart for a method for communication between a plurality of devices in a motor vehicle according to certain exemplary embodiments, and FIG. 5 schematically shows a block diagram for a communication system, having certain system components according to certain exemplary embodiments.

FIG. 4 shows a flow chart for a communication method for communication between a plurality of devices 26, 28 in a motor vehicle. The plurality of devices 26, 28 are situated in the motor vehicle 10 and are connected to one another via a transmission channel 32. The transmission channel 32 is coupled to a signal source 30. The communication method may be carried out, for example, by the above-described communication system 14 of the motor vehicle 10. All features described within the scope of the communication system may also be applied to the communication method. In particular, all of the above-described features regarding the monitoring unit 42 and its recognition of error states, the parallel connection of the devices 26, 28 to the current loop, the communication among the devices 26, 28, the coupling units 38, 40, and the signal conditioning unit 44 are transferable to the communication method.

In a first step S10, the control units 36 of the devices 26, 28 cause one of the devices 26, 28 to be connected to the transmission channel 32 at a certain point in time via at least two coupling units 38, 40 of the corresponding device 26, 28. In particular, this step S10 may be brought about by the control units 36 of the devices 26, 28 together, based on the option for communication of the devices 26, 28 with one another described with regard to the communication system 14.

In a second step S12, the control units 36 of the devices 26, 28 cause the other of the devices 26, 28 to be disconnected from the transmission channel 32 at the certain point in time, in each case via at least two coupling units 38, 40 of the other devices 26, 28. The certain point in time may in particular also be a sequence of multiple certain points in time, i.e., a certain time period.

In a third step S14, signals of the transmission channel 32 are evaluated by the control unit 36 of the device 26, 28, which at the certain point in time is connected to the transmission channel 36.

The order of steps S10 through S14 is not to be construed as limiting. Thus, for example, the prompting S12 for the other devices to be disconnected from the transmission channel may take place before S10 causes one of the plurality of devices to be connected to the transmission channel. Additional steps, which are derivable in particular from features described with regard to the communication system 14, may be inserted between steps S10 through S14, before or after these steps take place.

Figure 5:
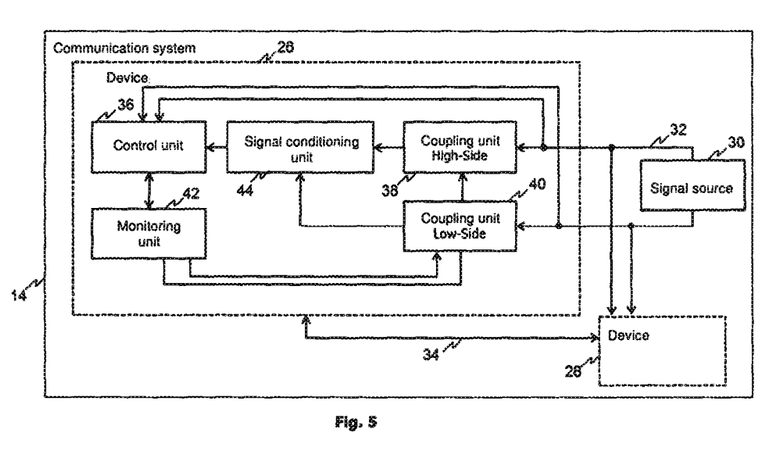

The communication system 14 according to FIG. 5 corresponds to the one according to FIG. 2 and operates in the same way, except for the differences described in the present paragraph. Reference numerals correspond to those in FIG. 2. In this embodiment, the control unit 36 of each of the devices 26, 28 is connected to the respective coupling units 38, 40. The monitoring unit 42 of each of the devices 26, 28 is likewise connected to the respective coupling units 38, 40. The monitoring unit 42 and the control unit 36 in each case monitor, independently of one another, whether an expected signal is present on the transmission channel 32. If the devices 26, 28 operate, for example, in a master-slave mode, i.e., one of the devices, for example the device 28, as the master is accorded priority in accessing the transmission channel 32, the monitoring unit 42 and the control unit 36 check whether a signal corresponding to a non-error case is present, such as a 4-20 mA current signal, and the coupling units 38, 40 of the device 26 according to the slave mode do not access the transmission channel 32, and in particular do not actively provide potential on the transmission channel 32, i.e., have electrically passive behavior.

The monitoring by the control unit 36 and the monitoring unit 42 may take place alternately in time. If the control unit 36 or the monitoring unit 42 detects an error on the transmission channel 32, for example that despite the master mode of the other device 28, the expected signal is not present, the control unit or the monitoring unit signals this to the respective other unit via an error level or an error flag, and grants access to the transmission channel 32 by the device 26, which in the slave mode originally operated in monitoring mode. The role allocation in the master-slave mode may be set, without circuit modification, merely by configuring the devices 26, 28, since both have the identical design with regard to the communication system 14. The monitoring unit 42 and the control unit 36 recognize errors in the particular device 26, 28 itself, and also recognize errors in the respective other device 28, 26 by checking the transmission channel 32. This results in a four-fold redundancy with regard to monitoring the functioning of the transmission channel, and a two-fold redundancy with regard to an error case in a particular device 26, 28. A two-fold redundancy is achieved for the control, the deactivation of the coupling units 38, 40, and/or the reading of the signal source 30.

The above-described variants and their design and operational aspects are used solely for a better understanding of the structure, the operating principle, and the properties; they do not limit the disclosure to the exemplary embodiments, for example. The figures are schematic in some cases in order to explain the functions, operating principles, technical embodiments, and features. In this regard, any operating principle, any principle, any technical embodiment, and any feature disclosed in the figures or in the text may be freely and arbitrarily combined with all claims, any feature in the text and in the other figures, other operating principles, principles, technical embodiments, and features that are contained in the present disclosure or result therefrom, so that all conceivable combinations may be associated with the described variants. Also encompassed are combinations between all individual statements in the text, i.e., in any section of the description, in the claims, and also combinations between various variants in the text, in the claims, and in the figures. Furthermore, the claims do not limit the disclosure, or thus, the options for combining all of the described features with one another. Moreover, all of the stated features are explicitly disclosed herein, individually and in combination with all other features.

The invention claimed is:

1. A communication system (14) for a motor vehicle (10), having:
    a plurality of control devices (26, 28) for determining a condition of the motor vehicle based on a signal;
    a transmission channel (32) that connects the plurality of control devices (26, 28) to one another; and
    a source (30) for the signal separate from the control devices (26, 28) and coupled to the transmission channel (32), wherein each of the control devices (26, 28) includes:
    a control unit (36) that is configured for evaluating signals of the transmission channel (32); and
    at least two coupling units (38, 40) that are configured for selectively connecting a particular control device (26, 28) to the transmission channel (32) for enabling the control devices (26, 28) to monitor the signal source (30) in a redundant manner, wherein the control units (36) of the control devices (26, 28) are configured for causing the coupling units (38, 40), at a certain point in time, to connect no more than one of the control devices (26, 28) to the transmission channel (32), and to disconnect another control device of the plurality of control devices (26, 28) from the transmission channel (32).

2. The communication system (14) according to claim 1, wherein each of the control devices (26, 28) also includes a monitoring unit (42) that is coupled to a particular control unit (36) and configured for recognizing an error state of the particular control device (26, 28) and signaling to the particular control unit (36) of the control device (26, 28), wherein the control units (36) of the control devices (26, 28) are configured to cause, at the certain point in time, particular coupling units (38, 40) of the particular control device (26, 28), for which the error state has been recognized, to disconnect the particular control device (26, 28) from the transmission channel (32).

3. The communication system (14) according to claim 1, wherein the control unit (36) and/or a monitoring unit (42) contained in one control device of the plurality of control devices (26, 28) are/is configured to cause the coupling units (38, 40) of the one control device (26, 28) to connect the one control device (26, 28) to the transmission channel (32) or disconnect the one control device (26, 28) from the transmission channel (32).

4. The communication system (14) according to claim 1, wherein the plurality of control devices (26, 28) are connected in parallel to one another via the transmission channel (32).

5. The communication system (14) according to claim 1, wherein the signal source (30) includes a switchable power source that is supplied with power by only the control device (26, 28) currently connected to the signal source (30) via the transmission channel (32).

6. The communication system (14) according to claim 1, wherein the plurality of control devices (26, 28) are configured for determining the no more than one control device (26, 28) by communication among the plurality of control devices (26, 28).

7. The communication system (14) according to claim 1, wherein the at least two coupling units (38, 40) of each control device (26, 28) include a high-side coupling unit (38) and a low-side coupling unit (40).

8. The communication system (14) according to claim 1, wherein each of the control devices (26, 28) also includes a signal conditioning unit (44) that is configured for receiving and providing the signals of the transmission channel (32) to the particular control unit (36) of the control device (26, 28) in a defined format.

9. The communication system according to claim 1, wherein the signal source is a single wheel speed sensor for producing a wheel speed signal and the control devices cooperate to monitor functionality of the single wheel speed sensor in a redundant manner.

10. A method for communication between a plurality of control devices (26, 28) in a motor vehicle (10), wherein the plurality of control devices (26, 28) are situated in the motor vehicle (10) and are connected to one another via a transmission channel (32), wherein the transmission channel (32) is coupled to a signal source (30) separate from the control devices (26, 28), and wherein the method comprises:
    operating control units (36) of the control devices (26, 28) such that one of the control devices (26, 28) is connected to the transmission channel (32) via at least two coupling units (38, 40) of the one control device (26, 28);
    operating the control units (36) of the control devices (26, 28) to disconnect the other of the control devices (26, 28) from the transmission channel (32) via at least two coupling units (38, 40) of the other control device (26, 28); and
    operating the control unit (36) of the one control device (26, 28), which is connected to the transmission channel (32), to evaluate signals of the transmission channel (32) from the signal source (30) while another control device (26, 28) of the plurality of control devices is used as a redundant evaluator of signals of the transmission channel (32) from the signal source (30).

11. A motor vehicle (10) that includes a communication system (14) according to claim 1.

* * * * *